United States Patent [19]

Boyle

[11] Patent Number: 4,863,317
[45] Date of Patent: Sep. 5, 1989

[54] PARTICULATE MATERIAL TRANSPORTATION

[76] Inventor: Bede A. Boyle, Commonwealth Bank House, 140 Hunter St., Newcastle, N.S.W., 2300, Australia

[21] Appl. No.: 70,110

[22] Filed: Jul. 2, 1987

Related U.S. Application Data

[63] Continuation of Ser. No. 762,047, Aug. 2, 1985, abandoned.

[51] Int. Cl.$^4$ .................... B65G 51/00; F04B 7/02
[52] U.S. Cl. .................... 406/109; 406/183; 406/197; 417/53; 417/519; 417/901
[58] Field of Search .................... 417/516–519, 417/901, 532, 62, 53, 183; 137/625.21, 625.22, 625.23; 251/250, 248; 406/108, 109, 154

[56] References Cited

U.S. PATENT DOCUMENTS

| | | | |
|---|---|---|---|
| 1,545,038 | 7/1925 | Davis | 417/532 X |
| 1,774,662 | 9/1930 | Parks | 417/519 X |
| 2,169,703 | 8/1939 | Mason | 417/900 X |
| 2,667,129 | 1/1954 | Graner | 417/900 X |
| 3,539,101 | 11/1970 | Huber | 251/250 X |
| 3,741,691 | 6/1973 | Schwing | 417/519 X |
| 3,838,941 | 10/1974 | Roschupkin et al. | 417/62 |
| 3,908,865 | 9/1975 | Day | 417/900 X |
| 4,265,737 | 5/1981 | Smith et al. | 406/197 X |
| 4,416,666 | 11/1983 | Funk | 406/197 X |
| 4,473,048 | 9/1984 | LeBlanc et al. | 417/519 X |
| 4,527,954 | 7/1985 | Murali et al. | 417/46 |

FOREIGN PATENT DOCUMENTS

| | | | |
|---|---|---|---|
| 686599 | 5/1964 | Canada | 417/900 |
| 2142095 | 1/1985 | United Kingdom | |

Primary Examiner—William L. Freeh

[57] ABSTRACT

Method and apparatus for transporting particulate material through a pipeline. The particles have a size distribution which provides a solids density of at least 85%. The particular have a maximum size of 20% of the bore.

5 Claims, 10 Drawing Sheets

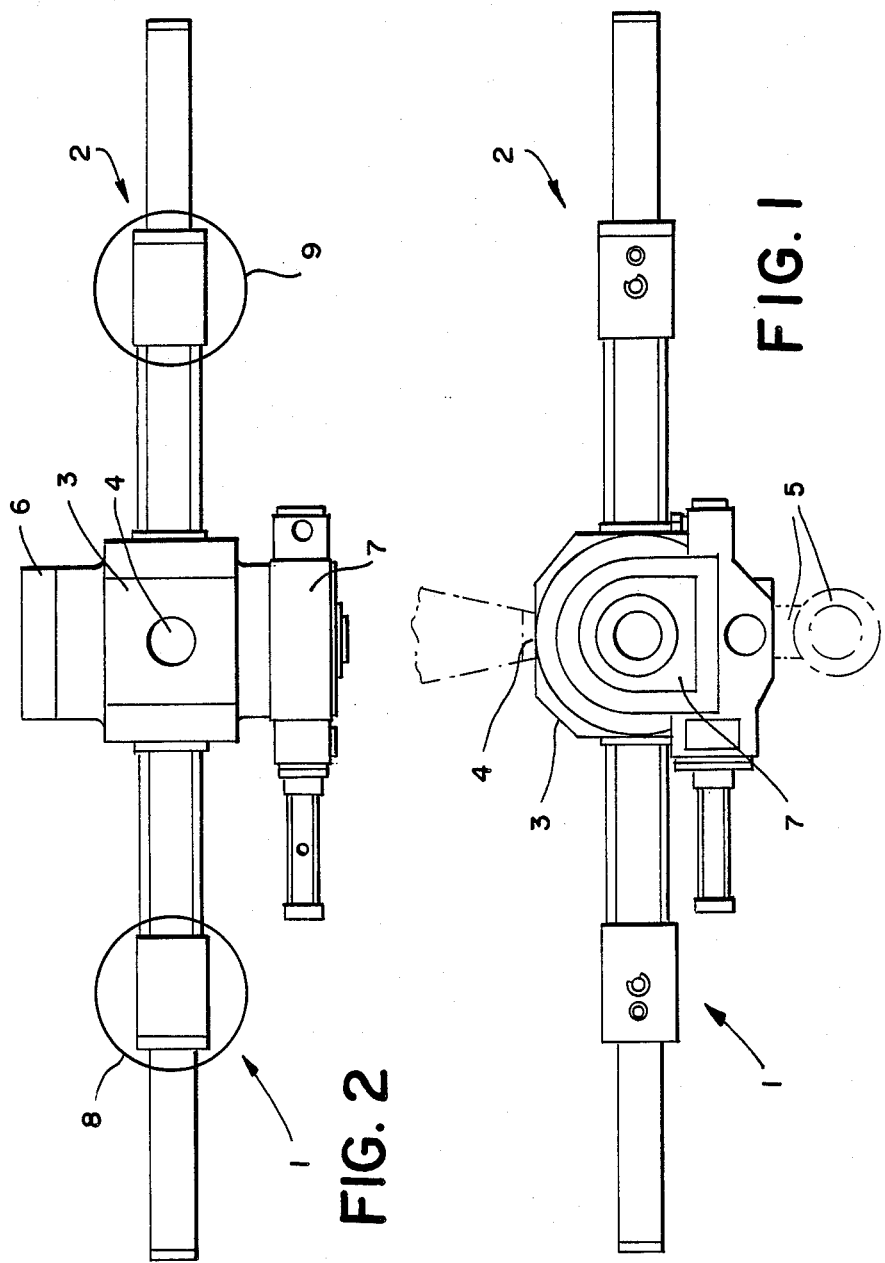

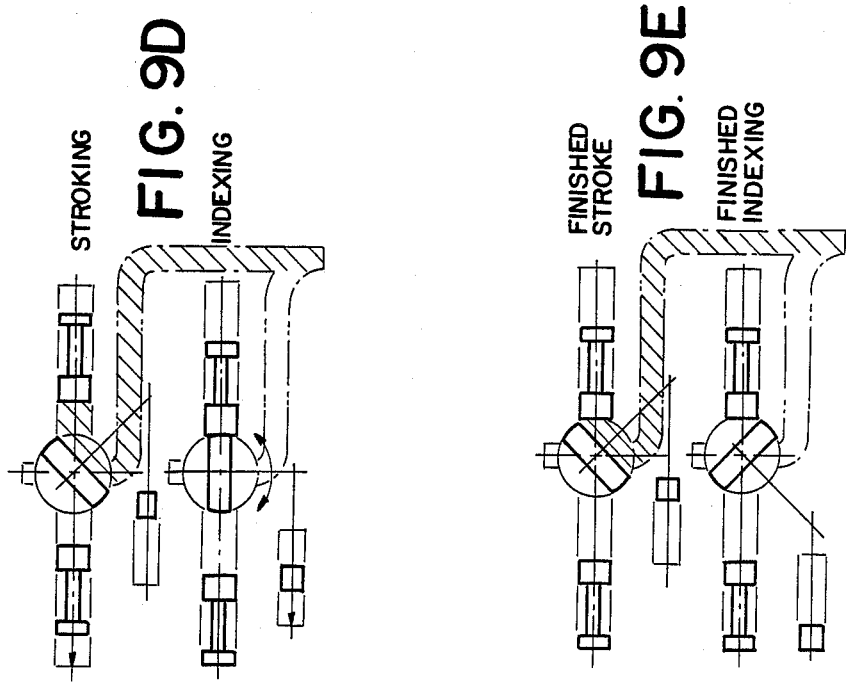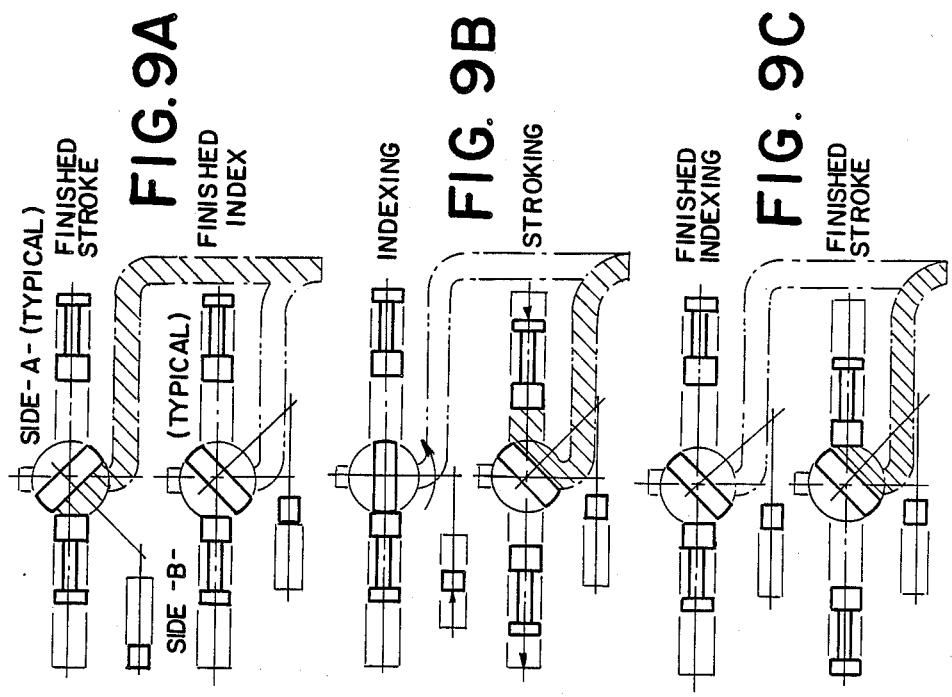

PARTICULATE MATERIAL TRANSPORTATION

This application is a continuation of Ser. No. 06/762,047 filed Aug. 2, 1985, now abandoned.

This invention relates to the transportation of particulate material through a pipeline, and more particularly to the pumping of a slurry through a pipeline by means of an oscillating-deflector pump.

In one example of the invention described herein the pump is adapted to transport materials such as coal, iron ore, limestone, wood chips, fly ash and other particulate solid materials. In the transport of minerals especially, it is of advantage to mix such material with water or some other suitable liquid to form a slurry, because the fluid-like properties of the latter reduce the resistance to motion of solid materials when moving relative to a stationary boundary or pipe wall.

In presently known systems for the transport of particulate materials, such as comminuted coal, various extensions of the well-known "Bechtel" technology are employed, and for these systems to succeed it is essential that sufficient fines should be provided to support the movement of larger particles along pipelines through which the coal is pumped. Thus, for most export requirements, it is necessary for such coals to undergo "manufacturing" to produce a suitable product, and then further processing, usually to reject the carrying medium, and/or dumping and re-processing for use in either coke ovens or thermal power stations. In this connection, existing pipelines usually require coal to be ground to less than 14 mesh, and in most coals a sufficient quantity of fines of the order of −325 mesh in excess of 20% is ensured to give a suitable slurry capable of being handled by available pumps and technology.

Positive displacement pumps for slurry pipelining of solid materials have developed largely because of mud pumping requirements in oilfield drilling. Many presently-used pumps for pipeline transportation over hundreds of miles are of crank-driven piston and ram design. Such pumps work directly on the slurry, or on some suitable liquid which contacts the slurry, in a chamber; or else the pumping liquid is separated by a diaphragm from the slurry in a chamber. Another known arrangement has chambers or hoppers in which the slurry is separated, by a ball-like element, from the pumped liquid.

In all these aforementioned prior art systems, pump cylinders and chambers are charged and discharged intermittently, and pumps are generally of duplex or triplex configuration to reduce fluctuations in flow rate, and usually a pneumatic damper is fitted to reduce pressure pulsations. In the chamber method, a sophisticated means of timing is necessary to control slurry discharge to the pipeline and hence reduce pressure fluctuations. Generally, positive displacement pumping arrangements require valves which can operate in slurry at a pressure of around 2000 p.s.i. The poppet type valve with elastic seating has widespread current use in these systems but is not immune to abrasion from slurry.

Piston slurry pumps characteristically have some kind of valve device which acts to shear off the slurry on both the suction and discharge flows.

Previous to the present invention the "state of the art" in coal slurry pipelining systems is as disclosed in U.S. Pat. Nos. 2,672,370 and 3,073,652; solids, in the form of particles ranging in size from sub-micron to several inches, can be transported hydraulically so long as the carrying medium moves at a velocity great enough to prevent their settling. For slurries that settle at rest there is a certain critical velocity, above which the solids will remain in suspension. Here, the energy lost due to pipe friction is a minimum, allowing the heterogeneous mixture to be pumped at optimum total energy input.

U.S. Pat. No. 2,672,370 is based on a critical minimum velocity for each particulate system, above which no appreciable particle settling occurs this is then a "heterogeneous slurry". This patent requires the velocity of the slurry through the pipeline to be suitable for maintaining the coal in suspension throughout the whole length of the pipeline. For optimum commercial operation the size of the coal should be between 0.0135 in. (40 mesh)×0 and $\frac{3}{8}$ in.×0. The concentration of the slurry is between 35% and 75% by weight of solids. The velocity of flow through the system is such as to ensure that no solids settle out and will, in general, under the conditions given above, range from 3 to 10 feet per second. For example, with a size consisting of $\frac{3}{8}$ in.×0 and a slurry concentration of 50% in a pipeline of 12 in. diameter, a velocity of at least 6 feet per second should be maintained. This confirms that it is indeed a "heterogeneous slurry".

Other slurries are homogeneous, containing enough fines to impede the settling of larger particles so long as the flow is turbulent. When the particles are too large, or the velocity is too low, a homogeneous flow can change into a heterogeneous one, or even to a flow where some solids settle to form either a stationary or sliding bed.

U.S. Pat. No. 3,073,652 has as its principal object the obtaining of the advantage of a more dynamically stable slurry in the long distance pipeline by employing a substantial amount of extremely fine coal particles in the slurry. This, then, is a "homogeneous slurry". In this patent, 20% to 40% of −325 mesh material is used as a carrier for a topsize of not greater than 4 mesh (0.185 in.) at a velocity of from 3 to 7 feet per second. The patent comprises the steps of preparing a slurry of coal and water comprising between 35% and 60% by weight of coal and water, then processing the coal to achieve a topsize of 4 mesh (0.185 in.) Tyler Standard Screen. Lastly, the coal is further processsed to have a spectrum of sizes and about 20% to 40% by weight of −325 mesh particles (0.0017 in.), preparing a water slurry comprising between 35% and 60% by weight of coal in water, and pumping the coal slurry at a velocity of between 3 and 7 feet per second over long distances. These are homogeneous slurries containing enough fines to impede the settling of larger particles and they behave as outlined.

Power requirements to maintain requisite fluid velocities are high, with the result that the inventive new concept has emerged.

Tests have resulted in the demonstration of a slurry pipeline system such that:

1. The wall of the pipe produces a preferred orientation of particles close to it. This produces in effect a slip-velocity at the wall.

This is achieved by limiting the amount of fines to those sizes which occur naturally during processing, so that there is a tendency for true fluid to come to the periphery of the product against the pipe wall, thus reducing friction Slurries with fines as a carrier suffer from increased viscosity and subsequent high pipeline friction losses. Tests have led to the knowhow of selecting a particle size distribution in a known manner which results in a maximum packing density of product in the order of 85% by weight of coal. Pumping this product through a pipeline of substantial length at a constant velocity, the said particle size meeting the market restraints for product size for both steaming and coking coal.

2. Uses the lowest possible velocity and hence causes minimum pipeline wear. Pipeline wear for a particular slurry is a function of velocity raised to some power greater than one, so a prime requirement to reduce wear is to minimise velocity within practical limits, such as one or two feet per second as required by the inventive system.

3. Transport highest possible density without danger of blocking the pipe on shut down - and restart.

4. For a given velocity friction losses are lower than
 a. Plug flow (laminar and turbulent combined)
 b. Laminar flow (homogeneous)
 c. Turbulent flow (heterogeneous)

5. Maximum conveyance efficiency - weight of product delivered per unit of power expended.

6. Possible to have friction losses no higher than that of water.

7. Possible to transport larger particles, limiting size 1/5 of pipe diameter.

8. Most importantly concentrations of up to 85% of coal bone dry basis (most known and published systems operating at up to 50–60% concentration).

9. No water retention or viscosity reducing chemical additives required.

10. Particles of coal are sufficiently close-packed for the slurry to be moved through the pipeline as an unbroken closely packed core. The fluid content of the slurry forms a slip-velocity at the wall which is in laminar flow. This ensures that no degradation of coal particles takes place during transit over substantial distances, as there is no shearing within the core itself.

When the change from turbulent flow to laminar flow occurs at the same velocity by increasing the concentration the change will be accompanied by a drop in friction. Now if the concentration is further increased and the velocity reduced there is a further reduction in friction, and the slurry is moving as a closely packed, cohesive, extruded core.

This has been demonstrated by tests where a greater capacity and a reduction in friction was realized at high concentrations of 85% by weight of coal. This high concentration is obtained by a known method of selecting a particle size distribution for a particular coal quality.

In laminar flow, friction varies as the velocity, whereas in turbulent flow friction varies as the square of the velocity. Thus, using laminar flow, both the friction and energy requirements are minimized. No occlusions can occur since the pipeline is pressure-filled.

A typical size distribution of a coal product meeting these requirements is an follows:

| + 25mm | 1–5% | 1 inch plus |
|---|---|---|
| 25 × 20 | 3–5 | |
| 20 × 12 | 6–10 | |
| 12 × 6 | 15–20 | |
| 6 × 3 | 15–20 | |
| 3 × 0 (3.3 mm) | 40–50 | 6 mesh (Tyler) 0.131 inches |

| | -continued | |
|---|---|---|
| Free moisture | 10–12% | |

A selection of these particle sizes giving a packing density of 85% by weight of coal has been pumped in the inventive system, at a velocity of one to two feet per second with true fluid slip at the wall of the pipe bore.

Researches in the U.S.A. and work in Australia in the area of coal water mix (cwm) for combustion have confirmed that pulverized coal, that is 70% passing −240 mesh, has a packing density of 60–65% by weight of coal. Higher concentrations can only be obtained by super fine grinding to produce a packing density of up to 75–80% by weight of coal.

These coal water mixes are highly viscous and in some instances chemical additives are needed for pumping.

At water contents less than 40%, the high viscosity of the fine coal water mix results in excessive transport costs.

This then has a tendency to limit the concentration of coal transport in the homogeneous flow regime to a concentration of about 50% of coal as a maximum as practised in the U.S.A. when using coal fines as a carrier fluid medium.

Coal preparation plants are now being designed and operated with two distinct product streams, one producing non-coking coal fusinites (steaming coal) and one producing a product with high vitrinite content (premium coking coal). Hence there is a requirement for a coal pipeline system capable of handling these two distinct product groups meeting the size requirements specified by the end user.

Usually coking coal is specified to have a top size 1 to 2 inches to zero with a minimum of fines less than 32 mesh (Tyler screen) and steaming coal with a topsize of 0.5 inches to zero. Each product is introduced into the pipeline separately with a trace in between to direct the delivered product to separate storage receival areas.

Hence the inventive system has been developed, capable of transporting coals from lignite to bituminous coals, without the requirement of having to reduce part of the product to sub-micron size with all the associated problems of production and treatment of the carrier medium.

It is therefore an object of the present invention to provide a system for the transportation of particulate material including a wear resistant, high pressure pump for the handling of, particularly, abrasive slurries and suspensions, and which eliminates the abovementioned problem of valve shear of the pressurized discharge product.

It is a further object of the present invention to eliminate completely all "manufacturing" or "processing" of the starting material, which can therefore be delivered to a site for pipeline transport in the same condition in which it happens to exist as a result of the mining and wash-rig procedure to which it has already been subjected.

It is yet a further object of the invention to permit the handling of steaming and coking coals, meeting the requirements of current export standards, with a minimum water content and power requirement for transport: that is to say, it is desirable that the size distribution of the solid particles in the slurry should be adjusted so as to achieve a close-packed formation such that voids (and therefore the water content) of such a slurry are at a minimum.

Apparatus suitable for carrying out the various embodiments of the invention as defined in the preceding paragraphs is based upon the concept that the optimum flow properties of the extruded slurry "core" can be achieved by adjusting, in known manner, the size distribution of the solid particles therein to give the greatest packing density possible. This size distribution can be controlled to impart a "fluidity" to the slurry to permit the transport of particulate material at the highest possible concentration.

It is to be noted that any such increase in concentration above the "loose-packing" condition will reduce the relative mobility of the particles and result in a rapid rise in pressure drop, until, at the close-packed formation, the solid particles are able to move through the pipeline as a continuous, cohesive extruded core with a resulting final reduction in pressure drop. If it can be ensured that adequate slip occurs at the wall of a pipe, then the material moving therein is flowing as a core with no shear within the slurry itself. In this case the velocity defining the shear rate at the wall is identical with the mean slurry velocity. Hence, provided that a layer of liquid at the wall has a sufficient thickness maintained by the material properties, then the shear rate at the wall is dependent only upon the slurry velocity itself and not upon the ratio of velocity to density as it is for other non-Newtonian liquids.

In tests leading to the present invention, it has been found that, if a pipeline pump handles the material at a controlled packing density whereby the sizing distribution gives a dry weight of approximately 85% for steaming or coking coal, the requirements for the most economical means of slurry transport are met.

It will be seen that the invention ensures that, because the slurry contains particles of normal size without any attempt to manufacture special sizes, the usual particle size versus settling velocity parameters do not apply, and hence any sized particulate solids may be transported satisfactorily at low velocities because the only force to be overcome to move the slurry in the pipeline is the force necessary to shear the water film, once it is ensured that the slurry is capable of moving as a continuous cohesive extruded core.

It is emphasised that a major advantage of the invention resides in the fact that the core of material not only moves bodily to give an economical delivery rate while shearing only the wall slip fluid, but also the absence of shearing forces within the core itself obviates any grinding action mutually between the particles in the core. Hence any degradation of those particles during transit is prevented, even throughout the distance from entrance to exit in a pipleline of substantial length.

Thus, in accordance with the present invention, there is provided a system for the transportation of particulate material comprising, in combination, an oscillating-deflector slurry pump and a pipeline fed by the said slurry pump, said particulate material being formed into a slurry with a compatible liquid medium and subsequently forced through said pipeline, the said slurry being formed by adjusting the size distribution of the solid particles therein so as to achieve a close-packed formation of such a degree as to be sufficient to enable said slurry to be moved through said pipeline as a continuous, cohesive extruded core with its boundary layer film adjacent to the pipeline inner wall in laminar flow so that the absence of shearing forces within the said core ensures that no degradation of the said particulate material can occur during the transportation thereof; said pipeline being characterized in that is possesses the smoothest possible bore which will resist the abrasive effect of the passage of said slurry therethrough, and said oscillating-deflector slurry pump being characterized in that it includes a pair of cylinder assemblies coaxially aligned one on either side of a centrally-disposed oscillating-deflector element; each said cylinder assembly having a housing, in which are defined registering coaxial hydraulic and slurry cylinder bores, and a piston rod having, at one end thereof, a hydraulic piston head slidably movable within said hydraulic cylinder bore and, at the other end thereof, a slurry piston head slidably movable within said slurry cylinder bore; said oscillating-deflector element being a substantially solid cylinder having an axis of rotation normal to the longitudinal reciprocal axes of said hydraulic cylinder and slurry cylinder bores and having, defined therein, two arcuately-formed communication passageways, each said passageway's opening being normal to an adjacent communication passageway's opening; said two passageways in said oscillating-deflector element enabling communication, alternately, in a first position, between a slurry inlet conduit and a first one of the said slurry cylinder bores and, in a second position, between said slurry inlet conduit and a second one of the said slurry cyinder bores; said second slurry cylinder being in communication with a slurry discharge conduit when said slurry inlet conduit is in communication with said first slurry cylinder bore, in said first position; said first slurry cylinder bore being in communication with said slurry discharge conduit when said slurry inlet conduit is in communication with said second slurry cylinder bore, in said second position; and the oscillating-deflector element remaining stationary, during piston stroking, so that uninterrupted, registering full bore areas are open to suction and discharge with no resistance being offered to flow of slurry into and out of said slurry pump so as to ensure continuous, pulse-free discharge of slurry.

In order that the reader may gain a better understanding of the present invention, hereinafter will be described a preferred embodiment thereof, by way of example only, and with reference to the accompanying drawings in which:

FIG. 1 is a general side elevation of an oscillating-deflector slurry pump in accordance with the present invention;

FIG. 2 is a corresponding plan view;

Figure 10:
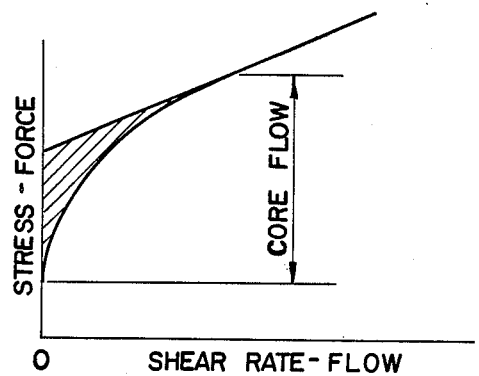
Figure 11:
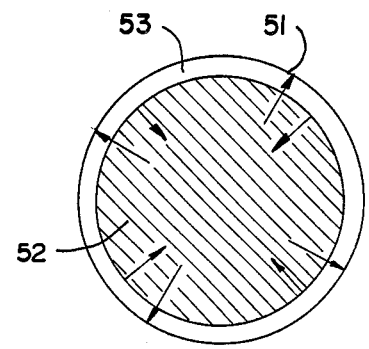
Figure 12:
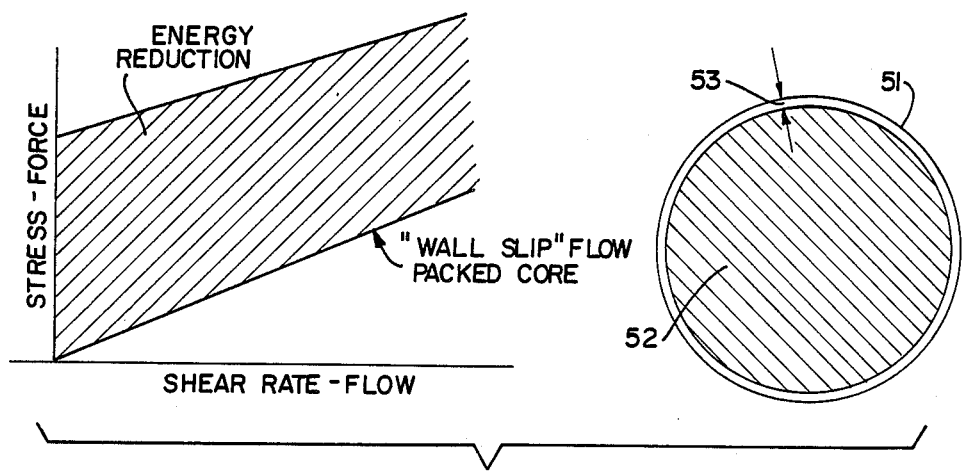

FIGS. 9A to 9I constitute a sequence diagram for the operation of a two-pump assembly;

FIG. 10 is an explanatory diagram showing the force to be overcome before flow can commence in a pipe;

FIG. 11 illustrates the so-called "Magnus Effect" in a pipe as velocity increases; and FIG. 12 is an explanatory diagram showing how "wall slip" fluid affects energy requirements in a pipe.

The drawings clearly show that the pump of the inventive system includes a pair of cylinder arrangements 1 and 2 aligned one either side of a centrally-disposed oscillating-deflector element accommodated within a housing 3 which has a slurry inlet conduit 4 and a slurry discharge conduit 5. In the generalized views of FIGS. 1 and 2 there can also be seen a housing 6 for the valve means and a further housing 7 for the reciprocating mechanism, both later to be described herein. Also later to be described herein are those portions of the cylinder arrangements which are circled and referenced 8 and 9.

Each cylinder arrangement is made up of a tubular housing in which are defined co-axial, registering hydraulic and slurry cylinder bores, which will better be seen and understood hereinafter with particular reference to FIGS. 5 and 6 of the drawings.

Figure 3:
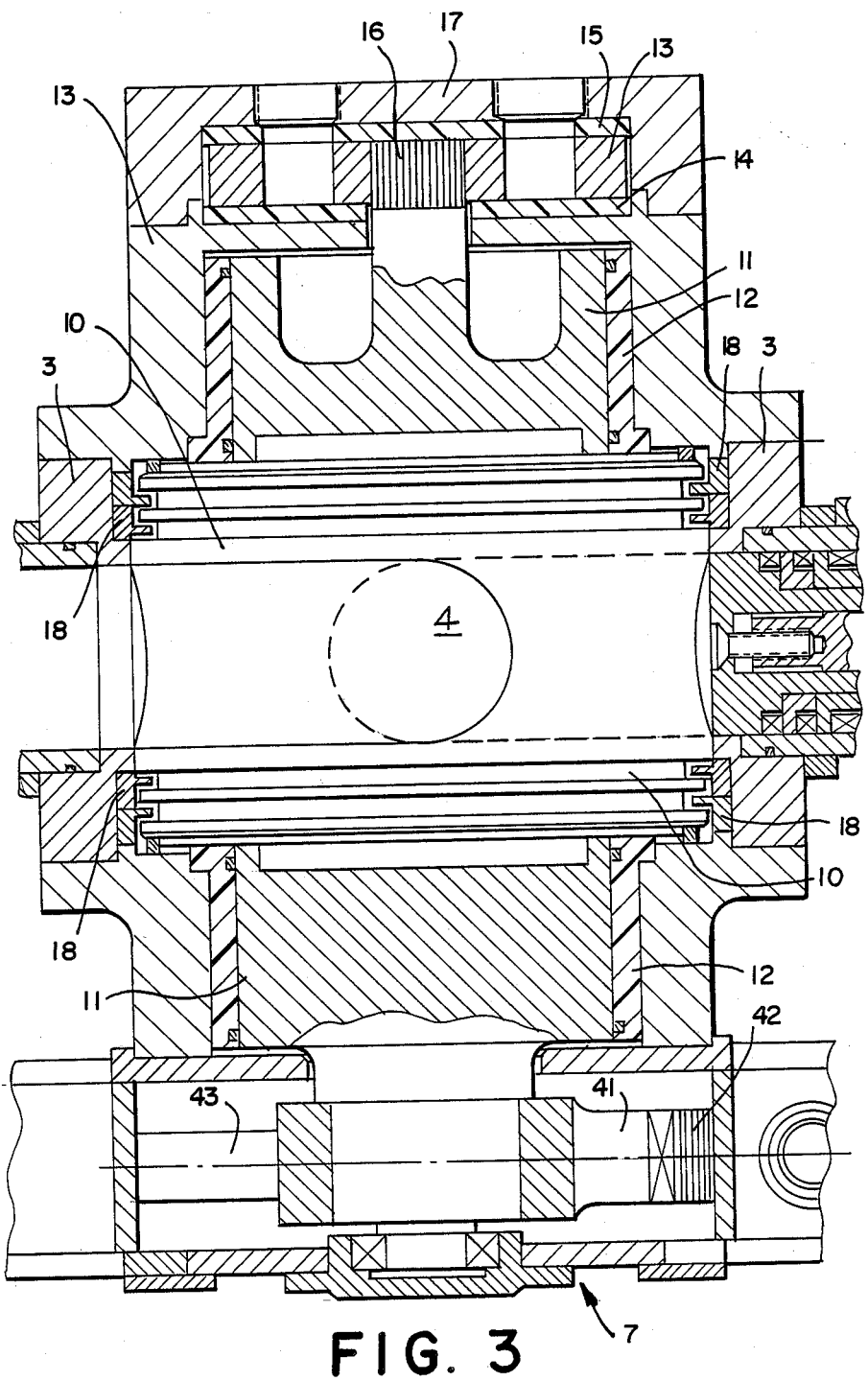
FIG. 3 is a horizontal cross-section.

FIG. 3 is a horizontal cross-section through the oscillating-deflector element and its housing 3, and illustrates the design detail of the components. Housing 3 accommodates an oscillating-deflector element 10 adapted to oscillate with an axial shaft 11 running in bearings 12. One end of axial shaft 11 carries a ported valve plate 13 adapted to control selection of the direction of oscillation of the oscillating-deflector element 10; valve plate 13 is faced on both sides by bearing plates 14 and 15. Valve plate 13 is rigidly affixed to the axial shaft 11 via a valve shaft 16; valve plate 13 and bearing plates 14 and 15 are covered by a stationary cover plate 17.

The other end of axial shaft 11 carries a reciprocating mechanism which operates so as to oscillate the deflector element.

The valve arrangement 13, 14, 15, 16 and 17 is shown in plan view in FIGS. 8–8a, to be described later herein, while the reciprocating mechanism will be hereinafter described with reference to FIG. 7.

FIG. 3 also shows the location of the "labyrinth" rings 18 which provide the sealing necessary to ensure a high. pressure grease interface between the pumped slurry and the bearings; the said interface acts between the deflector and its housing.

Figure 4:
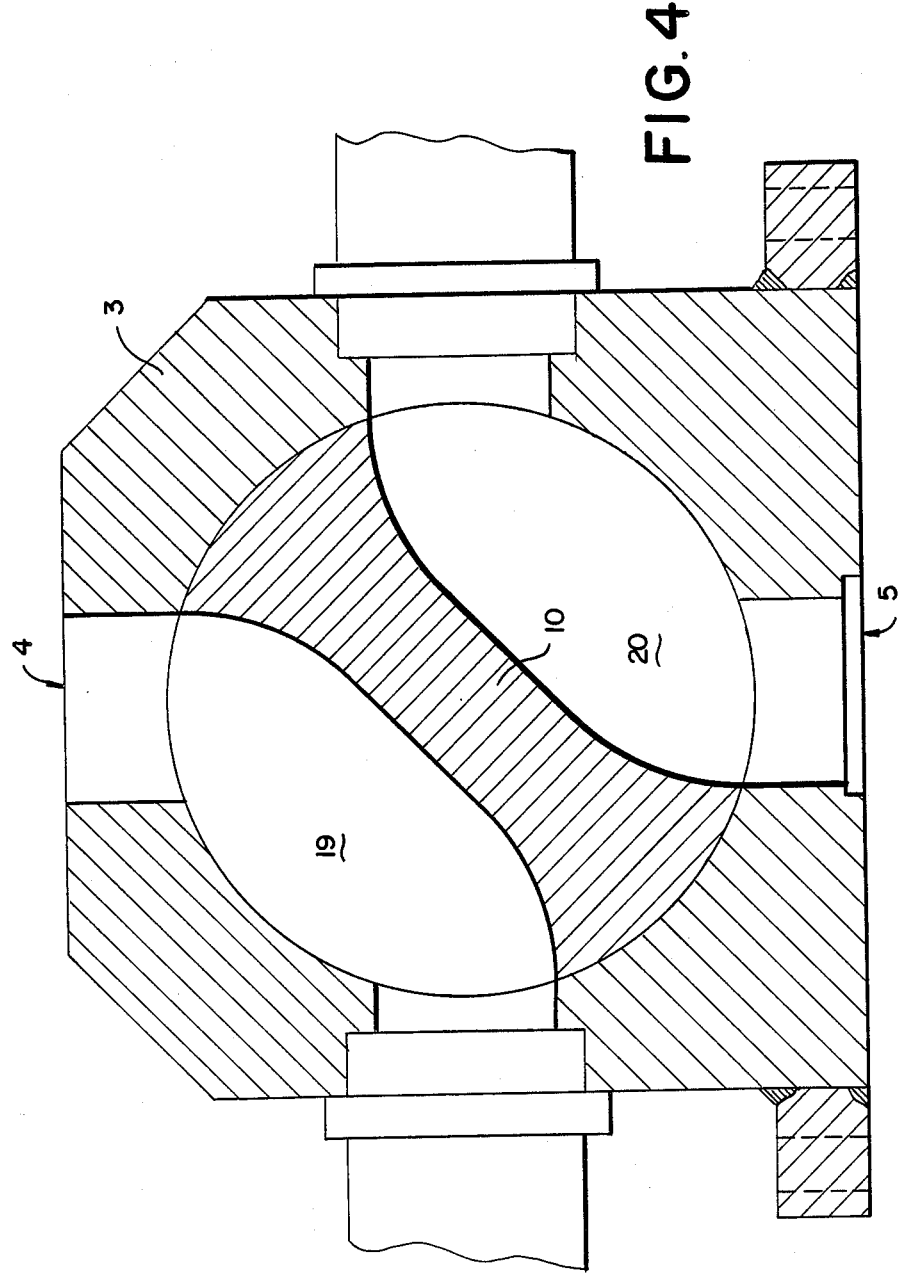
FIG. 4 shows, somewhat simplistically, the location of the oscillating deflector element within its

FIG. 4 shows, somewhat simplistically, the geometry of the oscillating-deflector element within its casing or housing 3 which has, as was to be seen in FIG. 1, a slurry inlet conduit 4 and a slurry discharge port 5. Within housing 3 oscillates an oscillating-deflector element 10 (see FIG. 3, also) which has the configuration of a right cylinder, substantially solid in the main but having defined therein the two communicating passageways 19 and 20, each of the passageways having a circular cross-section and being of substantially arcuate form.

Figure 5:
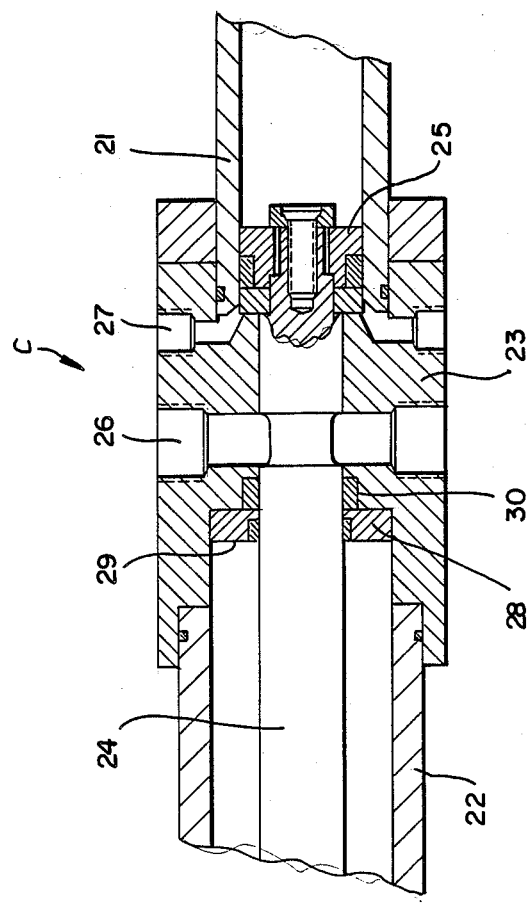
FIG. 5 is a vertical cross-section through one cylinder arrangement, circled and referenced "9" in FIG. 2.

FIG. 5 is a vertical cross-section through one cylinder arrangement c as circled and referenced g in FIG. 2, illustrating the design details of these components. Cylinder arrangement 2 includes a hydraulic cylinder 21 and a slurry cylinder 22 connected by a sleeve 23. Reciprocally movable through the two cylinders is a piston rod 24 having, at the end shown in FIG. 5, a hydraulic piston head 25. Sleeve 23 includes indexing cylinder ports 26 and cylinder return ports 27, while at the "sleeve end" of slurry cylinder 22 is a scraper ring 28 having a scraper ring seal 29, and a high pressure seal 30.

Figure 6:
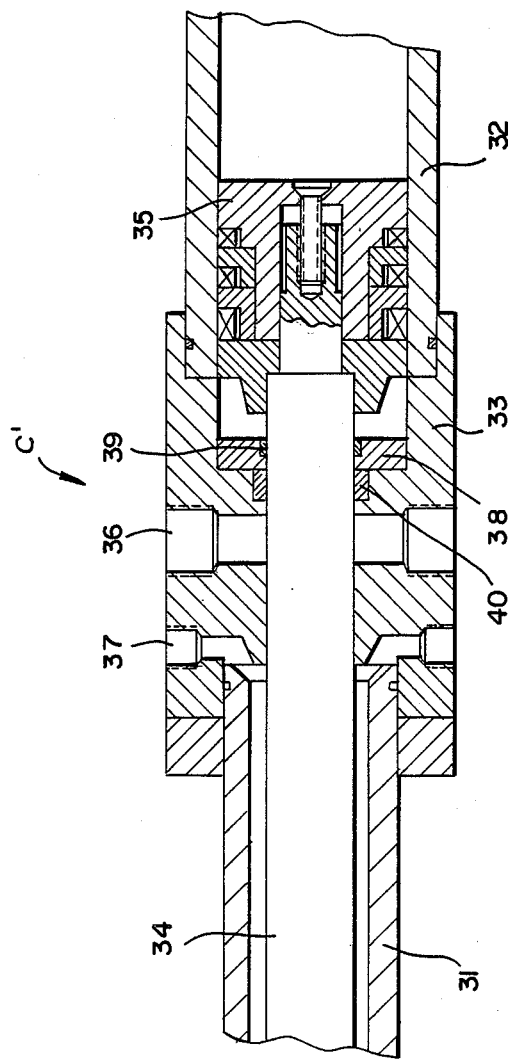
FIG. 6 is a similar vertical cross-section through the other cylinder arrangement, circled and referenced "8" in FIG. 2.

FIG. 6 is a vertical cross-section through the other cylinder arrangements C' as circled and referenced 8 in FIG. 2, illustrating the design details of these components. Cylinder arrangement 1 includes a hydraulic cylinder 31 and a slurry cylinder 32 connected by a sleeve 33. Reciprocally moveable through the two cylinders is a piston rod 34 having, at the end shown in FIG. 6, a slurry piston head 35. Sleeve 33 includes indexing cylinder ports 36 and cylinder return ports 37, while at the "sleeve end" of slurry cylinder 32 is a scraper ring 38 having a scraper ring seal 39 and a high pressure seal 40.

Pressure applied to the cylinder return ports fills the annular spaces between the piston rods and the cylinder bores. Each cylinder assembly will be understood to include the structure of both arrangements C–C', reversely disposed on opposite sides of the pump housing 3.

Now, considering together FIGS. 1 to 6, the reader will readily appreciate that oscillating deflector 10 enables communication to be made, alternately, between the slurry inlet conduit 4 and slurry cylinder 32, and between slurry inlet conduit 4 and slurry cylinder 22, slurry cylinder 22 being in communication with slurry discharge conduit 5 when slurry inlet 4 is in communication with slurry cylinder 32, and slurry cylinder 32 being in communication with slurry discharge conduit 5 when slurry inlet conduit 4 is in communication with slurry cylinder 22. The former arrangement is depicted in FIG. 4 while the latter condition occurs with the oscillating-deflector element angularly displaced 90°.

It should be noted that the hydraulic cylinders may be of the same, or smaller, or larger diameter than the slurry cylinders depending on designed pressure and flow requirements. Generally, however, the hydraulic cylinders will be of diameter smaller than that of the slurry cylinders to give a volumetric efficiency advantage.

The components of the pump which come in contact with the slurry are:
slurry piston head
slurry cylinder
centre deflector, and
deflector housing.

One possible desirable material selection is as follows:

The slurry piston head is of nickel-chromium-molybdenum steel case-hardened and ground to give a neat fit in the slurry cylinder, and is fitted with close-grained grey cast iron piston rings running in a chromed and honed 1% chromium-molybdenum steel slurry cylinder, with a back flushing soluble oil and water fluid mix.

The centre deflector and deflector housing is of a 1% chromium-molybdenum steel with a high carbon level. The mating surfaces are case-hardened and provided (by means of the labyrinths) with a water repellant grease interface.

Axial shaft 11, deflector element 10, valve shaft 16 and valve plate 13 are constructed as an integral unit and as such the indexing of the deflector element provides corresponding indexing of the valve plate.

Figure 7:
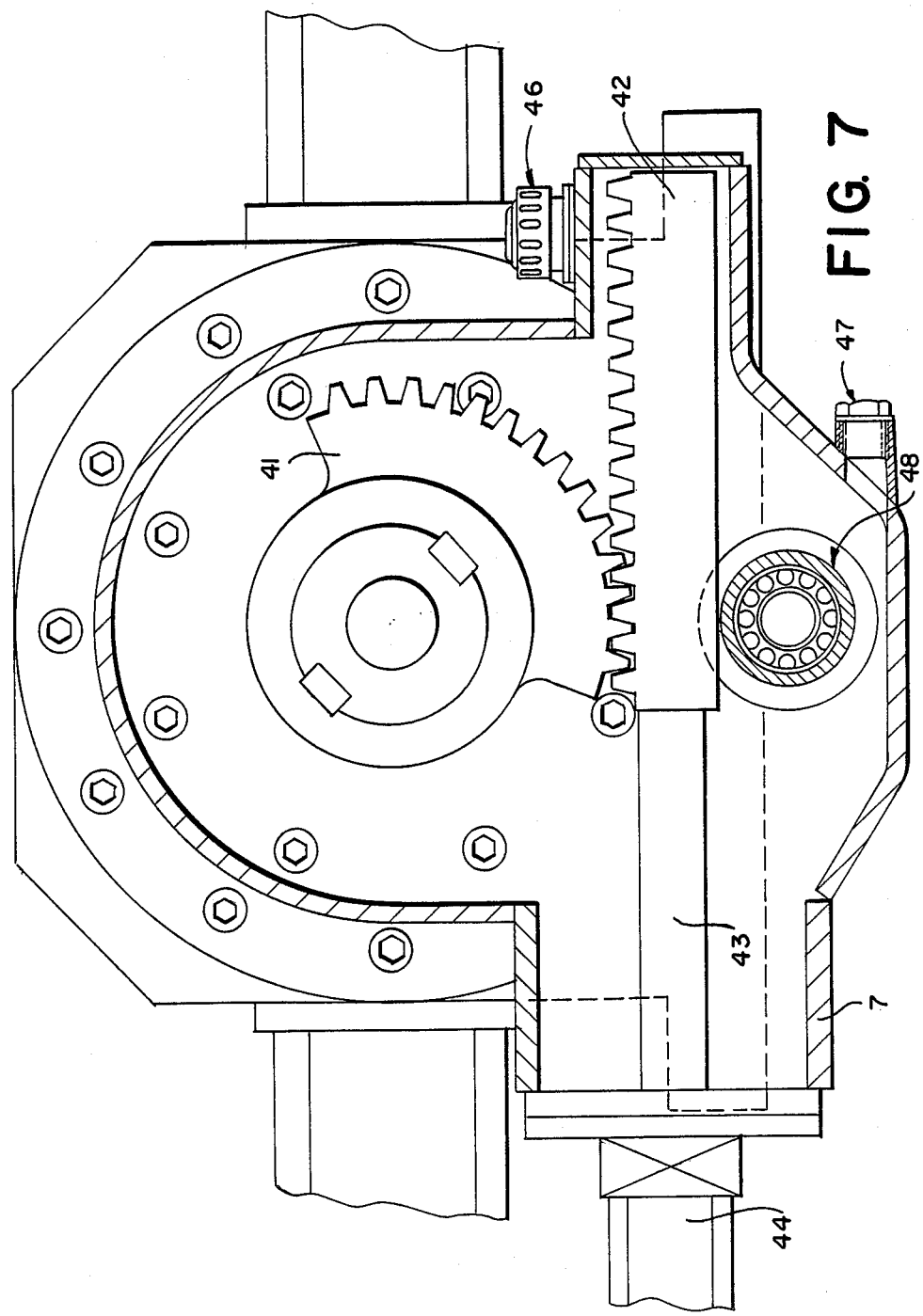
FIG. 7 shows how the reciprocating mechanism is arranged.

FIG. 7 shows the reciprocating mechanism. The opposite end of axial shaft 11 carries a gear quadrant 41 which co-acts with a gear rack 42 affixed to a piston rod 43 working in an indexing cylinder 44. The reciprocating mechanism housing 47 is provided with a conventional filler/breather 46, drain plug 47 and adjustment shaft 48.

Figure 8:
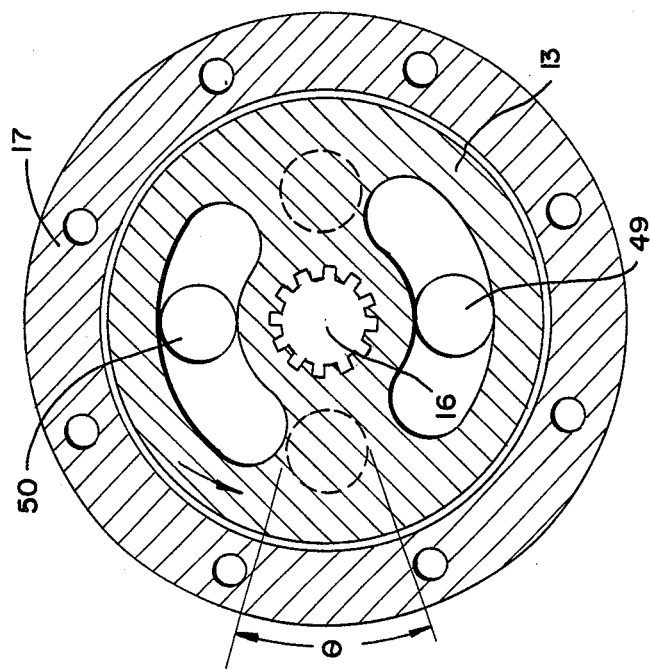
FIGS. 8–8a show the ported valve plate.
Figure 8A:
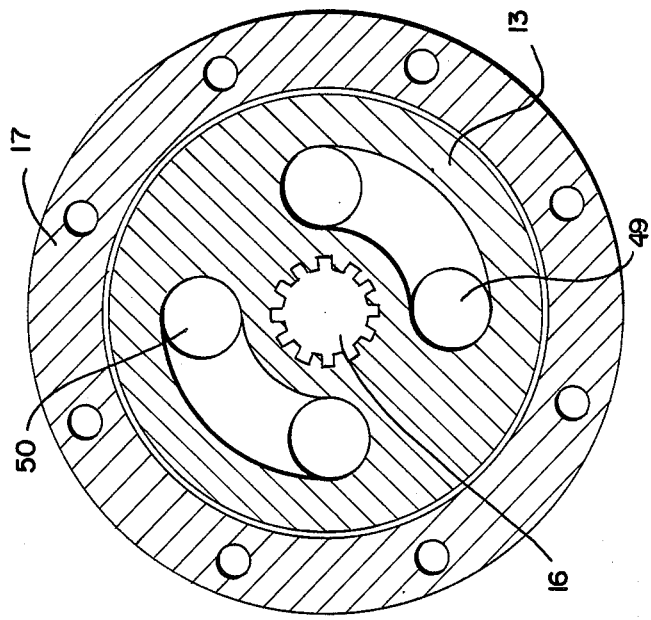

FIGS. 8–8a illustrate two positions of the parted plate valve 13 and should be perused with reference to FIG. 3. These plan views includes the valve shaft 16 and valve cover plate 17. Also shown are high pressure and return ports 49 and 59 respectively.

FIGS. 9A to 9I constitute a sequence diagram or flow chart for the operation of dual pump assembly which will result in full bore continuous discharge of pumped product. This dual pump assembly is termed a "duplex" pump and comprises two single or "simplex" pumps, as hereinbefore described with reference to FIGS. 1 to 8. The duplex pump comprises the two simplex pumps here designated "SIDE A" and "SIDE B" (see FIG. 9A). Needless to say, more than just two pumps may be employed to constitute what may aptly be termed a "multiplex" pump assembly.

FIG. 9A represents a starting configuration of pump pistons and centre deflectors. This position depicts the moment when pump side A has just completed a piston stroking sequence where both left hand and right hand pistons stroked left to right, the left hand piston executing a discharge stoke and the right hand piston executing a suction stroke.

Simultaneously the pump side B executed an indexing sequence with the centre deflector rotating 90° anti-clockwise to the configuration shown in position 1.

FIG. 9B shows the next operation which involves pump side A indexing the centre deflector 90° anti-clockwise (with both pistons stationary) whilst simultaneously, pump side B executes a piston stroking sequence where both left hand and right hand pistons stroke right to left, the left hand piston executing a suction stroke and the right hand piston executing a discharge stroke.

FIG. 9C shows the completion of this sequence with pump side. A fully indexed and pump side B fully stroked.

FIG. 9D shows the next operation with pump side A executing a piston stroking sequence with both left and and right hand pistons stroking right to left, whilst simultaneously pump side B executes an indexing sequence in a clockwise rotation (with both pistons stationary).

FIG. 9E depicts the completion of this operation.

Figure 9H:
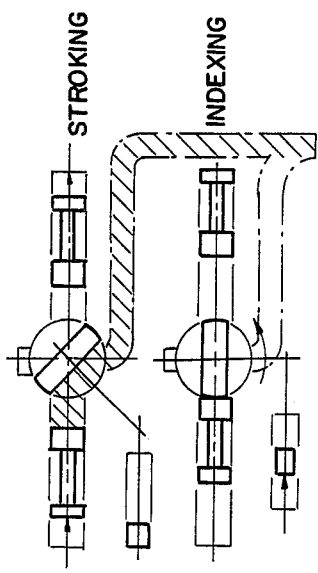
Figure 9I:
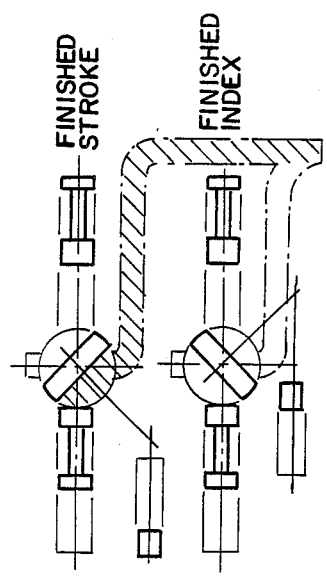
Figure 9F:
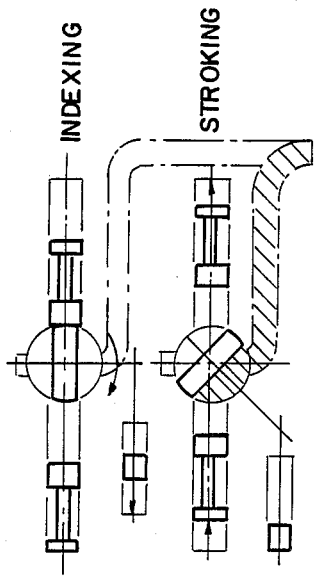

FIG. 9F depicts the next operation where pump side A indexes clockwise (with both pistons stationary) whilst pump side B executes a stroking sequence with both left hand and right hand pistons stroking left to right.

Figure 9G:
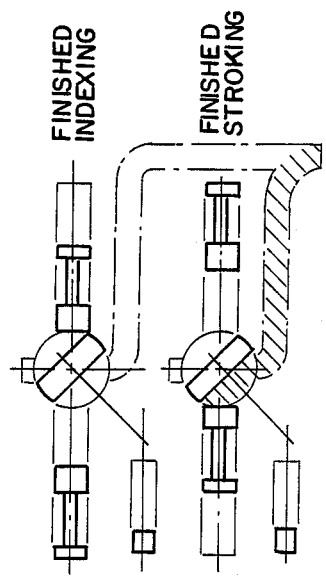

FIG. 9G depicts the completion of this operation.

FIG. 9H depicts the next operation with pump side A executing a stroking sequence with both left hand and right hand pistons stroking left to right, whilst pump side B executes an indexing sequence in an anti-clockwise rotation.

FIG. 9I depicts the completion of this operation and hence a complete pump cycle, with each of the four piston rods having executed one suction (inlet) stroke and one discharge stroke.

Turning back once more to FIG. 4, shown is one of the two positions which the deflector element holds while the pistons stroke, in this case from right to left. The fact that the centre deflector is stationary during piston stroking leads to one advantage of the pump - that is, that there are registering, uninterrupted full bore areas open to suction and discharge, thereby not offering any restriction to slurry flow into or out of the pump.

The fact that the centre deflector indexes 90° clockwise from the position shown constitutes another advantage of the pump, that is, that no part of the pump is required to shear through the pressurized line of discharge slurry, as the poppet valves or their equivalent are required to do in other known pumps.

As regards FIGS. 8-8a, this illustrates the valve plate 13 in two positions, the FIG. 8a showing valve plate 13 in fully indexed position, and FIG. 8 showing the valve plate rotating anti-clockwise, at the position where it is just opening to the cylinder ports. This position shows that, owing to the port lead angle 0°, the cylinders of one pump side are pressurized momentarily prior to the completion of the indexing sequence. Similarly the slots in the piston rods open the indexing cylinder ports momentarily before piston full stroke.

The hydraulic lines to the indexing cylinders are sized, or a variable restrictor is fitted, to ensure the condition that the same time is required to full stroke an indexing cylinder as is required to full stroke a pump piston. Thus for example, the same time is taken for valves to index, as for pistons to full stroke. This feature, combined with the valve overlaps and full bore slurry port openings, described above, will lead to a full bore, pulse free, continuous discharge.

Thus the inventive pump sucks in material through the full bore, valveless opening to a free cylinder. After 90° indexing of the oscillating deflector the sucked-in slurry is pushed directly into the delivery line, each cylinder operating in a controlled sequence of suction and discharge. Since the suction and discharge openings are constant, by virtue of the passageways of the oscillating deflector cylinder, there can be no slurry shearing troubles.

The above-described pump of the inventive combination will be seen to require very little maintenance and be suitable for the pumping of a wide variety of products. Moreover, the pump cannot "short stroke" because the full stroke must be achieved if the deflection of the control element is to occur at all.

The following list summarises some of the advantages of the above-described pump:
1. Pulse free
2. No electronic or pressure sensitive valves
3. Full line suction and discharge openings
4. No shearing of compressed pressurised discharge slurry
5. Valve overlaps to give continuous flow
6. Sizing hydraulic supply lines to give indexing in same time as piston stroking.

Referring now to FIGS. 10, 11 and 12 of the drawings, it will be appreciated that there may be four distinct regimes of particle conveyance within a structure such as the pipe referenced 51. Such a pipe, that is to say, a pipeline, may very well be a spirally-wound steel pipeline having a lining of such as abrasive-resistant basalt; alternatively, the pipeline may advantageously be fabricated from a high-tensile steel as that marketed as API 5LX stock.

The flow characteristics are:
(1) Conveyance as a heterogeneous suspension, which is maintained by turbulence in a liquid such as water;
(2) Conveyance by saltation, the particles being alternately picked up by a liquid and deposited further along the pipe; and
(3) Conveyance as a sliding bed.
(4) Homogeneous suspension flow, that is—laminar and turbulent combined.

The present inventive continuous, cohesive extruded core system with a true fluid slip-velocity at the inner wall of the pipe in laminar flow is more efficient than the above-mentioned systems of the prior art.

The reduction of the pipe friction loss of water suspensions in the extruded core, below that of clear water, resulting from the elimination of the loss due to turbulence within the said extruded core.

When the force applied to a pipe cross-section is lower than the yield point, the mixture is elastically compressed and water is squeezed out to the periphery of the plug, in much the same manner as would occur in a compressed wet sponge.

For this accepted concept it is essential that the transported material has a fluidity insofar that it will be compressible as a "sponge" to provide fluid on the periphery. This requires the application of an initial force to establish this condition before flow takes place.

As the "Magnus Effect" manifests itself the particles move towards the centre of the pipe 51 as the velocity of the transported material increases. The core is thus under pressure and the fluid moves towards the periphery and is maintained there by virtue of the flow velocity.

A further development of this concept is the provision of a means for ensuring a tightly packed core 52 of material surrounded by a film of "wall slip" fluid 53 which ensures a minimum resistance to flow whilst conveying the maximum quantity of material for a minimum expenditure of energy, as is shown in FIG. 10. This is achieved by selecting a spectrum of size fractions giving a packing density of 85% of "bone-dry" coal basis and the urging through a said pipeline by the supplying of a continuous, pulse-free pressure.

Thus it clearly emerges that the present invention will lend itself to a number of different applications, for instance:

In the field of coal sizing, characteristics of structure and hardness inherent in the coal beds are initially responsible for influencing the percentages of sizes produced. Depending on the coal structure and crushing or other degradation process or processes during preparation, there will result a product having a mixture of several slightly different size distribution patterns approaching the maximum packing density.

The breaking of coal is not a haphazard event in the sense that the distribution of sizes produced is entirely unpredictable.

If desired, the crushing of the coal may be controlled so that the product offered for transport has a size distribution giving the maximum packing density consistent with the topsize meeting the market restraints and a minimum generation of fines in the processing required to meet these conditions. The fines referred to are sized above the washery reject sizing and no other carrier is required.

It is desirable for the particle size distribution to be such that the voidage of the resultant product is a minimum, and should approach the theoretical minimum voidage of 2 to 3% by volume.

Theoretically, if slurries consist of equisized spherical particles, the packing densities of all size fractions would be identical, and for a rhombohedral arrangement the voidage would be 26% by volume.

If smaller spheres are inserted into the space between the large spheres without increasing the bulk volume of the assemblage, it is possible to reduce dramatically the overall voidage. Combinations of different size spheres, each set smaller than its predecessor, may be fitted into the voids and thereby reduce the overall voidage to 15% by volume. The use of fine particles to fill the remaining voids would reduce the voidage of 2 to 3% by volume.

Among the many laws of size distribution that have been developed for various solids, that suggested by "Rosin and Rammler" appears to most nearly represent the size distribution in broken coal. Rosin and Rammler applied their equation to fine coal only, but in 1936, J. G. Bennet found that the Rosin-Rammler distribution law applies to the entire output of a mine, including the very largest sizes. Bennet and his co-workers put the original equation into a more convenient form and provided a theroretical basis for it without the classical assumptions that coal is essentially a brittle, isotopic and homogeneous solid, a set of conditions which only a grain of uniform petrographic constitution might approximate.

The Bennet's form of the Rosin-Rammler size distribution is $$R = 100e - \left(\frac{x}{x}\right)n$$

by selecting a top particle size x the law is applicable for a particular coal, hence by the addition of finer particles for filling the voids the concentration can be increased in a known manner to achieve a maximum packing density in excess of 85% bone dry basis.

As part of most conventional so-called "coal conversion" processes, coal must be pumped into the heated and pressurized reactors, and subsequently some of it is recycled. The present invention of the oscillating-deflector pump and pipeline combination is particularly suitable for such processes.

The invention is also most suitable for gasification processes—fixed bed, entrained bed, and fluidised bed gasification. The oscillating-deflector pump can maintain pressure in the feed system while coal is fed steadily into the reactors to form a "seal" against back pressure of gas. This eliminates the necessity to bleed off gases in the feed system with resulting loss of energy.

There again, the present invention is also suitable for the feeding of pressurized fluidized bed steam generators and reactors. The pump and pipeline combination is quite capable of handling any combination of feedstock, either as a single product or in any combination required for the control and operation of the bed, and is capable of handling any number of distinct product streams from a coal preparation plant, where, from the requirement of the economics of dividing the coal product into such fractions as non-coking fusinites, steaming coal and higher vitrinite coking coal, and supplying the waste fine product for coal/water mixes, meeting the market restraints for product size and quality specification.

It is also capable of delivering a product at a variable delivery rate from zero up to full determined capacity so that the bed is under automatic control by this single unit, thus reducing control costs and complexity in comparison with existing PFBC.

The particulate material transportation system of the present invention is capable, moreover, of handling coals ranging from lignite to bituminous, irrespective of rheology changes in the coal/water mix for various coal qualities; and without the requirement of having to reduce part of the product to sub-micron size with all the associated problems of production and treatment of the carrier medium.

From the abovegoing, it will be readily appreciated that systems for the transportation of particulate material which comprise, in combination, an oscillating-deflector slurry pump and a pipeline fed by the slurry pump will provide the public with a new or much-improved commodity or, at the very least, will offer to it a useful and attractive choice.

What is claimed is:

1. A system for the transportation of particulate material comprising, in combination; an oscillating-deflector slurry pump having a slurry inlet conduit and a slurry discharge conduit; a pipeline fed by the said slurry discharge conduit, said particulate material being formed into a slurry with a compatible liquid medium and subsequently forced through said pipeline, the said slurry being formed by selecting the size distribution of the solid particles therein to give a packing density of plus 85% dry weight basis, with a maximum particle size limited to 20% of pipeline bore, so as to enable said slurry to be moved through said pipeline as a continuous, cohesive extruded core with its boundary layer film adjacent to the pipeline inner wall in laminar flow so that the absence of shearing forces within the said core ensures that no degradation of the said particulate material can occur during the transportation thereof; said oscillating-deflector slurry pump being characterized in that it includes a duplex assembly with each pair of cylinders coaxially aligned one on either side of a centrally-disposed oscillating-deflecting element which element oscillates together with an axial shaft, one end of which operates so as to oscillate the said element and the other end of which carries valve means which controls selection of the direction of oscillation of the said element, oscillating movement of said element being brought about by means of a regenerative indexing cylinder and a rotary valve actuator, both fulfilling the requirements of equal time for full movement in either direction, a ported valve plate carried by said other end of said axial shaft and having means to control said selection of the direction of oscillation of said element, each said cylinder assembly including registering coaxial hydraulic and slurry cylinder bores, a piston rod having at one end a hydraulic piston head slidably movable within said hydraulic cylinder bore and at the other end a slurry piston head slidably movable within said slurry cylinder bore, said oscillating-deflector element comprising a substantially solid cylinder having an axis of rotation normal to the longitudinal reciprocal axis of said hydraulic cylinder and slurry cylinder bores and having, defined therein, two arcuately-formed communication passageways, openings to each said passageway being normal to an adjacent one said passageway's opening, said two passagewyas in said oscillating-deflector element enabling communication, alternately, in a first position, between said slurry inlet conduit and a first one of said slurry cylinder bores and in a second position, between said slurry inlet conduit and a second one of said slurry cylinder bores, said second slurry cylinder being in communication with said slurry discharge conduit when said slurry inlet conduit is in communication with said first slurry cylinder bore in said first position, said first slurry cylinder bore being in communication with said slurry discharge conduit when said slurry inlet conduit is in communication with said second slurry cylinder bore in said second position, and said oscillating-deflector element remaining stationary during stroking of said piston heads so that uninterrupted, registering full bore areas are open to suction and discharge with no resistance being offered to flow of slurry into and out of said slurry pump so as to ensure continuous pulse-free discharge of slurry.

2. The particulate material transportation system as claimed in claim 1, wherein said material is "unmanufactured" coal, derived directly from a coal-face via a wash-rig.

3. The particulate material transportation system as claimed in claim 1, wherein said oscillating-deflector slurry pump and pipeline are capable of handling a plurality of distinct product streams from a coal preparation plant; whereby, from the requirements of the economics of dividing the coal product into non-coking fusinites, steaming coal, and high vitrinite coking coal and supplying waste fine products for coal/water mixes, market restraints for product size and quality specification are met.

4. The particulate material transportation system as claimed in claim 1, wherein said oscillating-deflector slurry pump and pipeline are capable of handling coals ranging from lignite to bituminous, irrespective of rheology changes in the coal/water mix and without the requirement of having to reduce at least a part of the product to sub-micron size, said reduction having associated problems of production and treatment of a carrier medium.

5. A method of transporting particulate material through a pipeline, comprising steps of selecting particles having a size distribution adequate to give a solids density of at least 85%, and a maximum particle size of 20% of the bore of the pipeline, forming an aqueous slurry of said particles, extruding said slurry into a cohesive continuous mass, and passing said mass through said pipeline.

* * * * *